(12) United States Patent
Haseloh et al.

(10) Patent No.: US 8,479,566 B2
(45) Date of Patent: Jul. 9, 2013

(54) PIPELINE LEAK DETECTION SYSTEM

(75) Inventors: Peter Haseloh, Kindersley (CA);
Donald LaFleur, Kindersley (CA)

(73) Assignee: Optimum Oilfield Instrumentation Ltd., Kindersley, Saskatchewan (CA)

( * ) Notice: Subject to any disclaimer, the term of this patent is extended or adjusted under 35 U.S.C. 154(b) by 476 days.

(21) Appl. No.: 12/485,325

(22) Filed: Jun. 16, 2009

(65) Prior Publication Data

US 2009/0308140 A1    Dec. 17, 2009

(51) Int. Cl.
*G01M 3/08* (2006.01)
*G01M 3/02* (2006.01)

(52) U.S. Cl.
USPC ............................. 73/49.1; 73/40.5 R

(58) Field of Classification Search
USPC ................. 73/40.5 R, 49.1; 340/605
See application file for complete search history.

(56) References Cited

U.S. PATENT DOCUMENTS

| | | | |
|---|---|---|---|
| 2,777,812 A | 1/1957 | Powell et al. | |
| 3,667,285 A | 6/1972 | Wright et al. | |
| 3,851,521 A * | 12/1974 | Ottenstein | 73/40.5 R |
| 3,962,905 A | 6/1976 | Jouve | |
| 4,280,356 A * | 7/1981 | Stewart | 73/40.5 R |
| 4,571,986 A | 2/1986 | Fujii et al. | |
| 4,796,466 A | 1/1989 | Farmer | |
| 5,272,646 A * | 12/1993 | Farmer | 702/51 |
| 5,295,392 A | 3/1994 | Hensel et al. | |
| 5,708,195 A * | 1/1998 | Kurisu et al. | 73/40.5 R |
| 6,032,699 A | 3/2000 | Cochran et al. | |
| 6,668,619 B2 * | 12/2003 | Yang et al. | 73/40.5 R |
| 6,970,808 B2 * | 11/2005 | Abhulimen et al. | 702/185 |
| 7,107,820 B2 | 9/2006 | Nunnally et al. | |
| 7,228,726 B2 | 6/2007 | Kates | |
| 7,290,440 B2 | 11/2007 | Gocho | |
| 2007/0151321 A1 * | 7/2007 | Ohmi et al. | 73/1.62 |
| 2008/0266125 A1 | 10/2008 | Windisch et al. | |

FOREIGN PATENT DOCUMENTS

| | | |
|---|---|---|
| CA | 1041192 | 10/1978 |
| WO | 2005/095916 A1 | 10/2005 |

OTHER PUBLICATIONS

Fraden, Jacob (2004). Handbook of Modern Sensors—Physics, Designs and Applications (3rd Edition). (pp. 348). Springer—Verlag.*
Wilson, Jon S. (2005). Sensor Technology Handbook. (pp. 441). Elsevier.*

* cited by examiner

*Primary Examiner* — Daniel Larkin
*Assistant Examiner* — Jamar Ray
(74) *Attorney, Agent, or Firm* — Davis & Bujold, PLLC

(57) ABSTRACT

A pipeline leak detection system, includes, in combination, a pipeline; pressure sensors positioned at regular spaced intervals along the pipeline to monitor pressure within the pipeline; and a monitoring station receiving data from the pressure sensors. The monitoring station establishes a normal pressure profile of relative pressures recorded by the pressure sensors along the pipeline in the absence of a leak and issues an alarm should one of the pressure sensors provide data which is uncharacteristic of the normal pressure profile, indicating a leak in the vicinity of the one pressure sensor.

9 Claims, 2 Drawing Sheets

PIPELINE LEAK DETECTION SYSTEM

FIELD

The present invention relates to a system that will detect leaks in pipelines carrying fluids.

BACKGROUND

The present invention was developed for use in pipelines carrying oil, but may have application to pipelines carrying other fluids. Pipelines carrying oil are often hundreds of kilometers in length. When a leak occurs it is important that persons maintaining the pipelines are immediately made aware of the fact that there is a leak and where the leak is situated along the length of the pipeline.

SUMMARY

According to one aspect, there is provided a method of detecting and locating leaks in a pipeline, comprising in combination: positioning pressure sensors at regular spaced intervals along a pipeline, the pressure sensors monitoring pressure within the pipeline; establishing a normal pressure profile of relative pressures recorded by the pressure sensors along the pipeline in the absence of a leak; and monitoring the pressure sensors for a change occurring in one of the pressure sensors which is uncharacteristic of the normal pressure profile, indicating of a leak in a vicinity of the one pressure sensor.

According to another aspect, there is provided a pipeline leak detection system, comprising in combination: a pipeline; pressure sensors positioned at regular spaced intervals along the pipeline to monitor pressure within the pipeline; and a monitoring station receiving data from the pressure sensors. The monitoring station establishes a normal pressure profile of relative pressures recorded by the pressure sensors along the pipeline in the absence of a leak and issues an alarm should one of the pressure sensors provide data which is uncharacteristic of the normal pressure profile, indicating a leak in the vicinity of the one pressure sensor.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION

Figure 1:
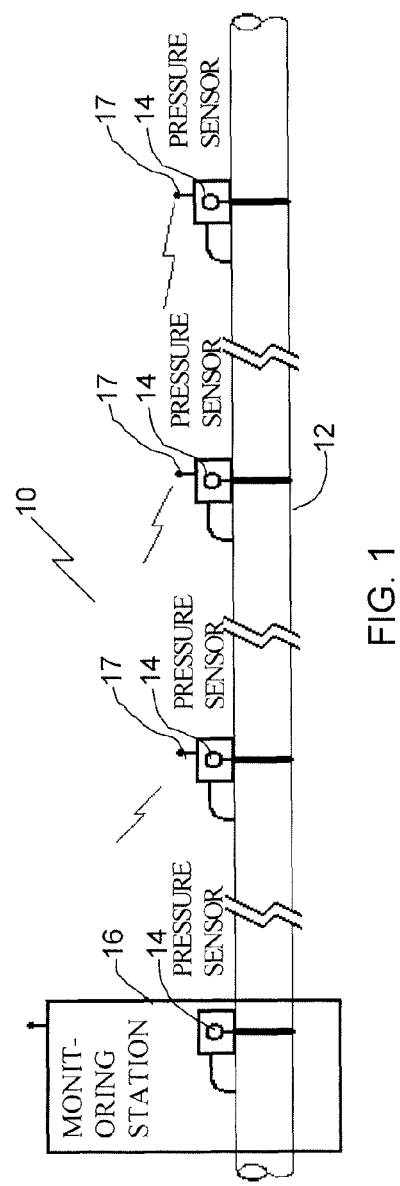
FIG. 1 is a schematic of a pipeline leak detection system.

A pipeline leak detection system generally identified by reference numeral 10, will now be described with reference to FIG. 1 through 4.

Structure and Relationship of Parts:

Referring to FIG. 1, pipeline leak detection system 10 includes a pipeline 12, and pressure sensors 14 positioned at regular spaced intervals along pipeline 12 to monitor pressure within pipeline 12. Pressure sensors 14 are preferably sufficiently sensitive to detect small changes in pressure. A monitoring station 16 receives data from pressure sensors 14, and establishes a normal pressure profile of relative pressures recorded by pressure sensors 14 along pipeline 12 in the absence of a leak. An alarm is issued if one of the pressure sensors 14 provides data which is uncharacteristic of the normal pressure profile, which indicates a leak in the vicinity of the pressure sensor 14. Data is transmitted to monitoring station 16 via a communications link, such as a wireless transmitter 17.

Figure 3:
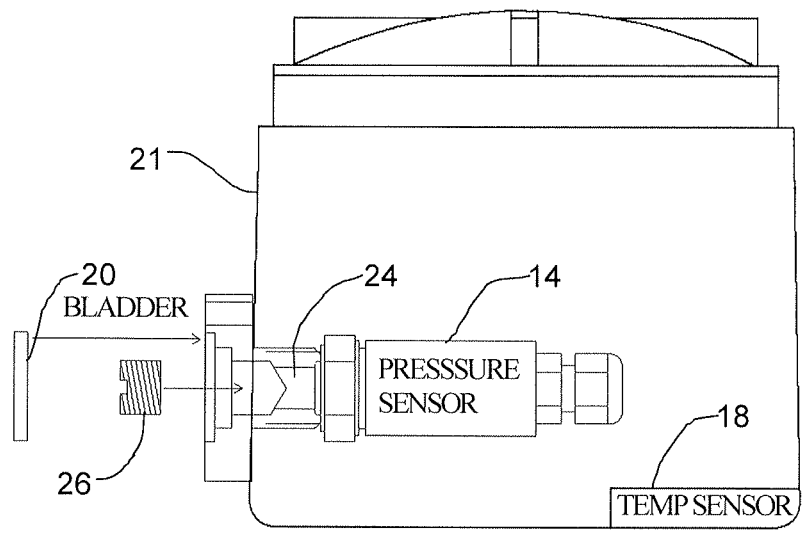
FIG. 3 is a partially transparent exploded side elevation view of a housing for a pressure sensor.

The system uses small changes in pressure to determine the presence of a leak. Since the readings of pressure sensors 14 will depend on the temperature, to improve accuracy of the normal pressure profile at different ambient temperatures, the pressure sensors are maintained at a common temperature. In the depicted embodiment, fluid in the pipeline is used to bring all of the pressure sensors to the temperature of the fluid in the pipeline. Other means of maintaining a common temperature will be apparent to those skilled in the art. Referring to FIG. 3, each pressure sensor 14 has an associated temperature sensor 18 to ensure that this condition is met.

Figure 2:
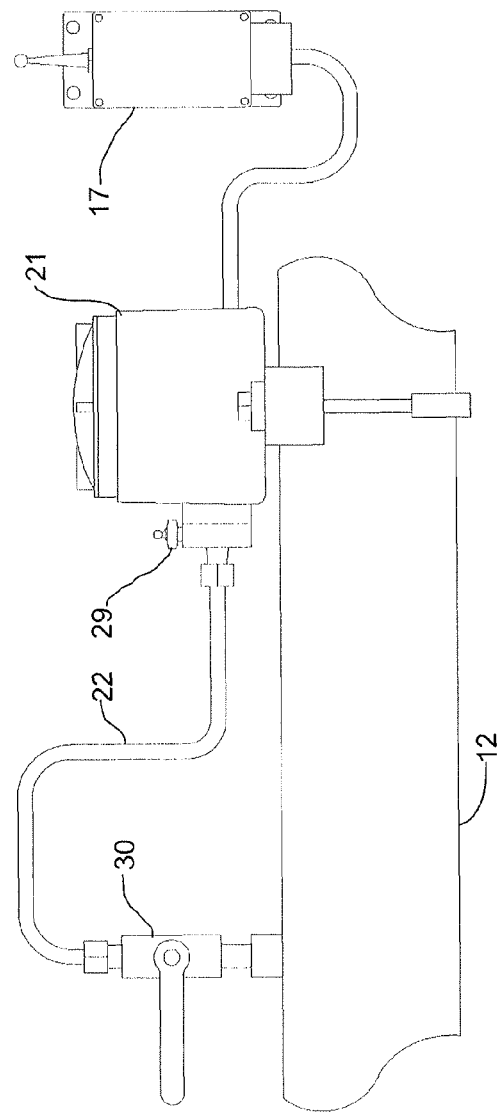
FIG. 2 is a side elevation view of a housing for a pressure sensor.

Referring to FIG. 3, a protective barrier, such as a bladder 20, is provided to protect each sensor 14 from contamination by the fluid carried within the pipeline. As depicted, bladder 20 is located within a sensor housing 21. Sensor housing 21 is preferably an explosion proof box with internal electronics. Referring to FIGS. 2 and 3, housing 21 has a first compartment such as an outer gland 22 and a second compartment such as an inner gland 24, which are each filled with clean lubricant. Outer gland 22 is preferably filled with a viscous lubricant and inner gland 24, in which pressure sensor 14 is located, is preferably filled with a less viscous lubricant.

To install sensor 14 in the depicted embodiment, referring to FIG. 3, inner gland 24 is filled with, for example, clean oil, and is sealed with a pressure snubber screw 26 to reduce pressure spikes and bladder 20. Referring to FIG. 2, outer gland 22, which is a stainless steel line filled with, for example, grease. Outer gland 22 may be filled by pumping grease into a zerk with a bleeder valve 29 open. Once filled, the bleeder valve is closed, and a ball valve 30, which connects outer gland 22 to pipeline 12, is opened.

Figure 4:
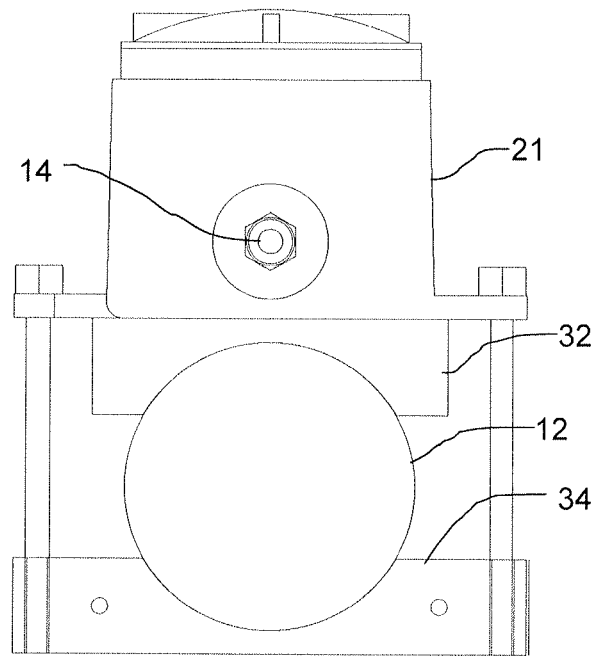
FIG. 4 is an end elevation view of a housing for a pressure sensor.

Referring to FIG. 4, sensor housing, which carries pressure sensor 14 and temperature sensor 16, is attached to pipeline 12 using a saddle 32 and clamp 34 connection. Saddle 32 and clamp 34 may be exchanged for different sizes depending on the size of pipeline 12. To maintain pressure sensors 14 at a constant temperature, the temperature of the fluid in pipeline 12 is conducted to sensors 14 and 16 through saddle 32 and housing 21. Preferably, thermal grease or other thermal conducting substance is supplied between pipeline 12 and saddle 32, and between saddle 32 and housing 21. This transfers the temperature of the process liquid into housing 21 to maintain pressure sensors 14 at a constant temperature along pipeline 12.

Operation:

Referring to FIG. 1, a preferred embodiment of detection system 10 is depicted, where a main pressure sensor 14 is located at a monitoring station 16, such as a pumping station, and other "satellite" sensors 14 are spaced along pipeline 12. The satellite sensors 14, and associated temperature sensors 18 are programmed to periodically transmit readings to the monitoring station 16, such as every 2 minutes, via communication link, such as a wireless transmitter 17. A computer (not shown) in the monitoring station 16 records the time, temperature, and pressure readings, and tracks any changes. A profile is created for the pipeline that can be compared against to determine normal operating conditions. Since liquids are largely incompressible, the pressure at each sensor 14 will track the others closely, and stay within the profile stored within the computer. In the profile, the pressure should decrease slightly the farther the pipeline extends from the monitoring station 16. A leak is detected when the pressure detected by a pressure sensor 14 decreases abnormally from the profile. For example, the pressure at consecutive sensors 14 may be 800 PSI, 790 PSI, 780 PSI, etc. If the third reading drops to 770 PSI while the other sensors remain constant, it is likely that a leak has occurred. This condition would generate an alarm, either within the monitoring station 16 to notify an operator, or by generating a phone message, page, or other message to an off-site operator.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiments without departing from scope of the Claims.

What is claimed is:

1. A method of detecting and locating leaks in a pipeline, comprising in combination:
    positioning pressure sensors at regular spaced intervals along a pipeline, the pressure sensors monitoring pressure within the pipeline;
    establishing a non-zero normal pressure profile of relative pressures recorded by the pressure sensors along the pipeline in the absence of a leak;
    monitoring the pressure sensors for a change occurring in one of the pressure sensors which is uncharacteristic of the non-zero normal pressure profile, indicating a leak in a vicinity of the one pressure sensor, wherein monitoring the pressure sensors for a change comprises comparing each pressure sensor to the non-zero normal pressure profile.

2. A pipeline leak detection system, comprising in combination:
    a pipeline;
    pressure sensors positioned at regular spaced intervals along the pipeline to monitor pressure within the pipeline;
    a monitoring station being configured to receive data from the pressure sensors, establish a non-zero normal pressure profile of relative pressures recorded by the pressure sensors along the pipeline in the absence of a leak, compare each pressure sensor to the non-zero normal pressure profile and issue an alarm should one of the pressure sensors provide data which is uncharacteristic of the non-zero normal pressure profile, indicating a leak in the vicinity of the one pressure sensor.

3. A pipeline leak detection system comprising in combination:
    a pipeline;
    pressure sensors positioned at regular spaced intervals along the pipeline to monitor pressure within the pipeline;
    a monitoring station being configured to receive data from the pressure sensors, establish a non-zero normal pressure profile of relative pressures recorded by the pressure sensors along the pipeline in the absence of a leak, compare each pressure sensor to the non-zero normal pressure profile and issue an alarm should one of the pressure sensors provide data which is uncharacteristic of the non-zero normal pressure profile, indicating a leak in the vicinity of the one pressure sensor; and
    means to maintain all pressure sensors at a common temperature.

4. The pipeline leak detection system of claim 3, wherein each pressure sensor has an associated temperature sensor.

5. The pipeline leak detection system of claim 3, wherein fluid in the pipeline is used to bring all of the pressure sensors to the temperature of the fluid in the pipeline.

6. The pipeline leak detection system of claim 2, wherein a protective barrier is provided to protect each sensor from contamination by the fluid carried within the pipeline.

7. The pipeline leak detection system of claim 6, wherein the protective barrier is a bladder.

8. The pipeline leak detection system of claim 7, wherein the bladder is positioned within a housing, and the housing containing a lubricant.

9. The pipeline leak detection system of claim 7, wherein the housing has a first compartment filled with a viscous lubricant and a second compartment in which the pressure sensor is located filled with a less viscous lubricant.

* * * * *